Jan. 2, 1951 L. C. HOLMES ET AL 2,536,810
METHOD AND APPARATUS FOR IMPROVING THE
LOW-FREQUENCY RESPONSE IN MAGNETIC
RECORDING AND REPRODUCING UNITS
Filed April 16, 1945 3 Sheets-Sheet 1

FREQUENCY RESPONSE OF TYPICAL REPRODUCING HEAD

EFFECT OF USING A LONG GAP IN A REPRODUCING HEAD

INVENTORS
LYNN C. HOLMES
DONALD L. CLARK
BY D. Clyde Jones
ATTORNEY

Jan. 2, 1951

L. C. HOLMES ET AL

METHOD AND APPARATUS FOR IMPROVING THE LOW-FREQUENCY RESPONSE IN MAGNETIC RECORDING AND REPRODUCING UNITS 2,536,810

Filed April 16, 1945

3 Sheets-Sheet 2

FREQUENCY RESPONSE OF REPRODUCING HEAD WITH THREE GAPS

VARIATION OF PERPENDICULAR COMPONENT OF MAGNETIC FIELD AROUND THE RECORDING MEDIUM

INVENTORS
LYNN C. HOLMES
DONALD L. CLARK

BY D. Clyde Jones

ATTORNEY

INVENTORS
LYNN C. HOLMES
DONALD L CLARK
BY
D. Clyde Jones
ATTORNEY

Patented Jan. 2, 1951 2,536,810

UNITED STATES PATENT OFFICE 2,536,810

METHOD AND APPARATUS FOR IMPROVING THE LOW-FREQUENCY RESPONSE IN MAGNETIC RECORDING AND REPRODUCING UNITS

Lynn C. Holmes, Fairport, and Donald L. Clark, Rochester, N. Y., assignors to Stromberg-Carlson Company, Rochester, N. Y., a corporation of New York Application April 16, 1945, Serial No. 588,688

16 Claims. (Cl. 179—100.2)

The invention relates to a method of and to apparatus for reproducing ferromagnetic records.

The frequency response of a conventional reproducing unit operated by a ferromagnetic record, is not uniform throughout the desired range, being less at low frequencies than at high frequencies. Due to this lack of uniformity in response, it has been necessary to use an expensive amplifying system to compensate for the shortcomings of the reproducing unit unless poor fidelity is tolerated.

An important feature of the present invention relates to a novel method of obtaining from a ferromagnetic record of sound, a substantially uniform response throughout the audio frequency range from below two hundred cycles to well above four thousand cycles without the use of expensive equalizing circuits.

Another feature of the present invention relates to a magnetic reproducing unit of simple and inexpensive construction which develops such uniform response throughout the desired frequency range that extra amplification necessitated by equalizing networks, becomes unnecessary.

A further feature of the invention relates to a reproducing unit for ferromagnetic records, the unit being provided with one portion having its greatest response in one part of the frequency range and another portion having its greatest response in another part of said range.

A further feature of the invention relates to a ferromagnetic reproducing unit having two cooperating portions each of which substantially compensate for the response deficiencies of the other portion whereby the overall frequency response of the unit is substantially uniform over the usual reproduced frequency range.

Other features and advantages of the invention will appear from the detailed description and claims when taken with the drawings, in which:

Figure 1:
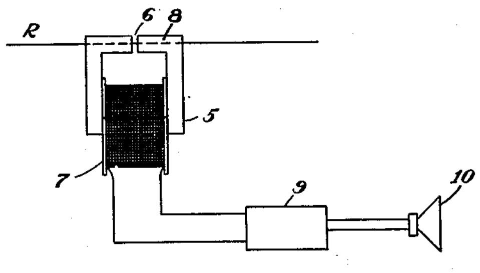
Fig. 1 is a schematic showing of a conventional reproducing head for ferromagnetic records.

Fig. 1 shows schematically a conventional type of reproducing head or unit usually employed with the magnetic recording system in which the elementary magnets are parallel to the length of the recording medium, that is, with longitudinal recordings, on ferromagnetic wire or tape R. This unit comprises a ferromagnetic core 5 having a gap 6 therein. A coil 7 encircles a portion of the core. As herein illustrated, the portions of the core at each side of the gap have a slot 8 therein to guide the ferromagnetic recording medium R across the gap 6. The terminals of the coil are preferably connected to an amplifier 9, the output of which is connected to a suitable transducer 10 for audible or visible signals, as desired. The alternating voltage induced in the coil with a sinusoidal distribution of flux density along the length of the recording medium can be calculated from the following relation (neglecting the effect of discontinuities where the recording medium enters and leaves the head):

$$(1) \qquad E=KB_m \sin \frac{\pi l_g}{\lambda}$$

where E is the R. M. S. value of the induced voltage;

K is a constant depending upon the coupling between the recording medium and the magnetic circuit, its size and configuration, upon the coil, and upon the velocity of the recording medium.

$B_m$ is the maximum internal remanent flux density across a cross section of the recording medium corresponding to the maximum instantaneous value of recorded signal.

$l_g$ is the length of the gap 6.

$\lambda$ is the shortest distance measured along the length of the recording medium between points having the same flux density in the same direction (hereafter referred to as "wavelength").

The wavelength depends upon the velocity, V, with which the recording medium moves past the recording head and upon the frequency, F, of the recorded signal as follows:

$$(2) \qquad \lambda=\frac{V}{F}$$

It then becomes apparent that the voltage, E, induced in the coil 7 of the reproducing head can be expressed as follows (the velocity of the medium past the reproducing head being the same as that past the recording head):

$$E=KB_m \sin \frac{\pi l_g F}{V} \tag{3}$$

Figure 2:
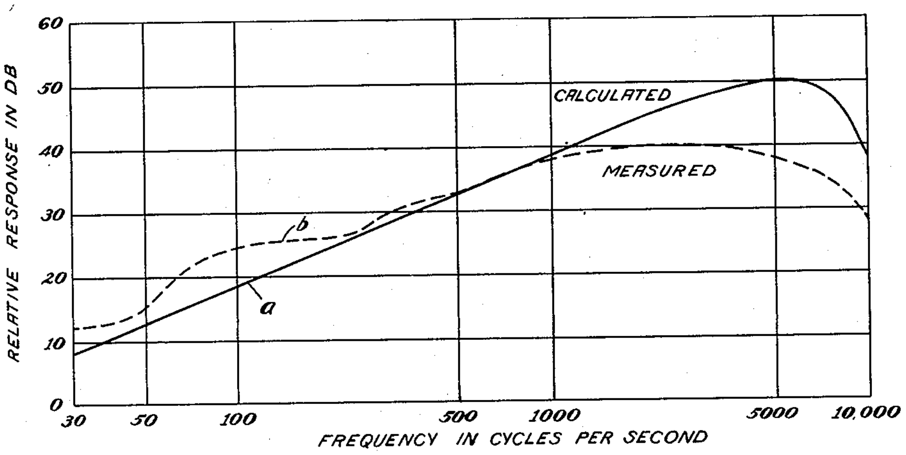
Fig. 2 is a chart indicating the frequency response of a conventional reproducing head, the chart comprising two curves, one of which indicates the calculated response and the other curve the measured response of such a head.

In a practical system, the length of the gap and the velocity of the recording medium are fixed so that the induced voltage becomes a function of frequency. The full curve *a* of Fig. 2 shows the frequency response calculated from this relation for practical values of the velocity of the medium and the length of the gap. The broken curve *b* shows an experimental frequency response. The undulations in the low frequency region are due to the discontinuities where the recording medium enters and leaves the reproducing head.

It is apparent from these curves that the voltage available from the reproducing head is much less at low frequencies than at medium and high frequencies. This is a serious disadvantage in the reproduction of music where it is desirable to have the voltage uniform regardless of the frequency of the reproduced signal. It necessitates the use of extra amplification and of equalizing networks having voltage-frequency characteristics which are the inverse of the voltage-frequency characteristic of the reproducing head.

Obviously it would be desirable to design a reproducing head, the frequency response of which would be uniform over most of the audible range of frequencies. To do this, it is necessary to consider ways in which the induced voltage at low frequencies can be increased.

Figure 3:
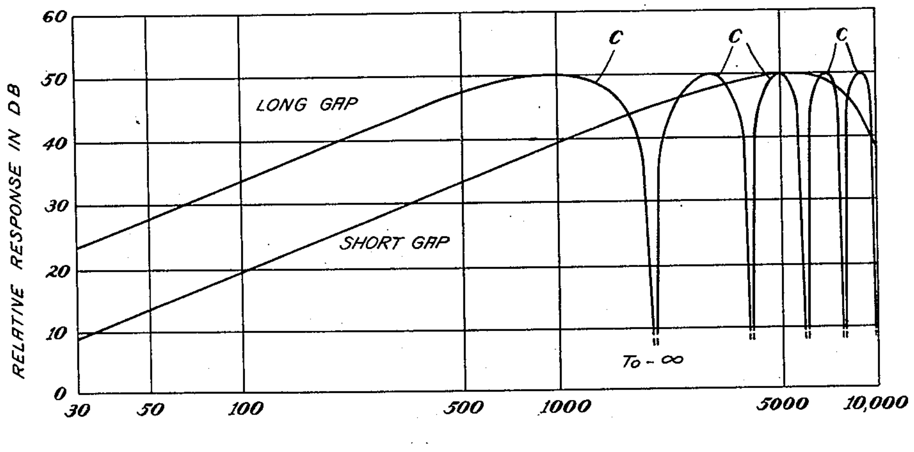
Fig. 3 is a chart indicating the effect of using a short gap and a long gap in a reproducing head.

The most obvious way to increase the induced voltage at low frequencies is to increase the length of the gap 6 or $l_g$. Fig. 3 shows the frequency response curve *c* of a reproducing head having a relatively long gap. The calculated curve *a* from Fig. 2 is replotted in Fig. 3 for comparison. It is apparent that using a longer gap will increase the voltage available at low frequencies. However, it is also apparent that there are several frequencies in the medium and high frequency region at which the voltage drops to zero. These frequencies are such as to make $$l_g=n\lambda \tag{4}$$

where $n$ is a positive integer. This sort of characteristic is totally unsuitable for reproduction of music.

Figure 4:
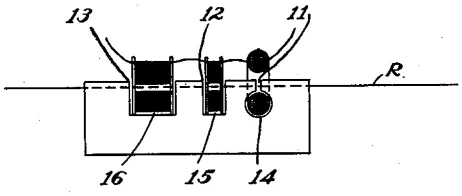
Fig. 4 is a schematic illustration of a reproducing head provided with three gaps.
Figure 5:
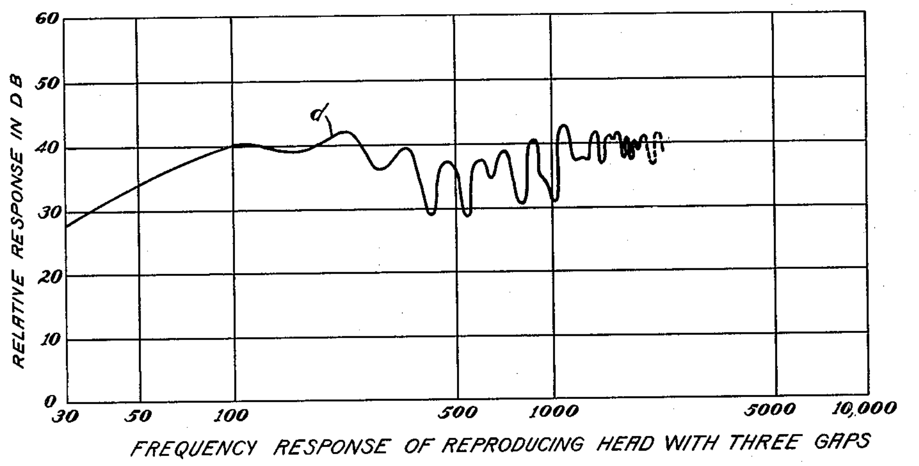
Fig. 5 is a chart showing a frequency response of a reproducing head provided with three gaps similar to those illustrated in Fig. 4.

It might occur to one to use a reproducing head having two or more gaps, one short gap 11 to give good reproduction of medium and high frequencies and one or more long gaps, such as 12 and 13, to give good reproduction of low frequencies. Such a reproducing head is shown schematically in Fig. 4. This was designed to give equal output voltages at 150, 300, and 600 cycles per second, there being little rise in the output voltage above 600 cycles per second due to self-demagnetization with the particular type of recording medium used. The output voltage was made equal at the three frequencies chosen by choosing the length of each gap, the distance between centers, the number of turns on each coil 14, 15 and 16 and the polarities of these coils with respect to each other. Fig. 5 shows an experimental frequency response curve *d* for this head.

It can be seen that this type of reproducing head has a frequency response characteristic which is as unsuitable for reproduction of music as that of a single long gap. The dips in the frequency response are not entirely due to the voltage from a reproducing head with a long gap falling to zero at certain frequencies because with the three coils in series, there will be no frequency within the audible range at which the voltage from each of the three coils is zero simultaneously. However, there can be a large phase difference between the voltage induced in one coil and that induced in another because at medium and high frequencies, the distance between centers of the gaps may be several wavelengths. These voltages will add in phase at certain frequencies, giving peaks in the frequency response, and will add out of phase at other frequencies, giving dips in the frequency response. Thus, in addition to the voltage from each coil varying in magnitude to make irregularities in the frequency response, the way in which the voltages add also varies, causing even more irregularities.

The problem might be solved by using a multiple gap reproducing head and eliminating or reducing the voltages from the long gaps at higher frequencies where they not only are not needed but cause trouble. This might be done with electrical filters in a manner analogous to that used in feeding a dual loud speaker where the low frequencies are reproduced by one speaker and the high frequencies by another. However, this method would probably be more expensive and less satisfactory than that used with a conventional reproducing head, that is, using extra amplification and equalization.

A more practical way of eliminating the high frequency response from the low frequency section of the reproducing head can be seen by considering the magnetic field in the vicinity of the recording medium. The following expression has been derived for the component of the magnetic field perpendicular to the length of the recording medium.

$$H_z=\frac{4M\pi}{\lambda}\left(\sin \frac{2\pi X}{\lambda}\right)K_1\left[\frac{2\pi Z}{\lambda}\right] \tag{5}$$

where $H_z$ is the component of the magnetic intensity perpendicular to the length of the recording medium.
- $M$ is the maximum value of the magnetic intensity on the axis of the recording medium.
- $\lambda$ is the wavelength, previously defined.
- $X$ is the distance from the origin to the point at which it is desired to find $H_z$, measured along a line parallel to the axis of the recording medium.
- $Z$ is the perpendicular distance from the axis of the recording medium to the point at which it is desired to find $H_z$.
- $K_1$ is a modified Bessel function of the second kind of order one.

This expression was derived on the assumptions that the perpendicular component of the magnetic field is the one effective in producing flux changes in the reproducing head, that the source of magneto-motive force can be considered concentrated at the axis of the recording medium, that the distribution of magnetomotive force is sinusoidal along the length of the recording medium, and that the recording medium is infinitely long. None of these assumptions is a serious limitation in applying the theory to a practical case. This expression has been used to calculate the variation of the perpendicular component of the magnetic field as the distance from the center of the recording medium and the wavelength are varied. Curves representing this variation are shown in Fig. 6 for the case of a 0.004″ diameter wire as the recording medium.

Figure 6:
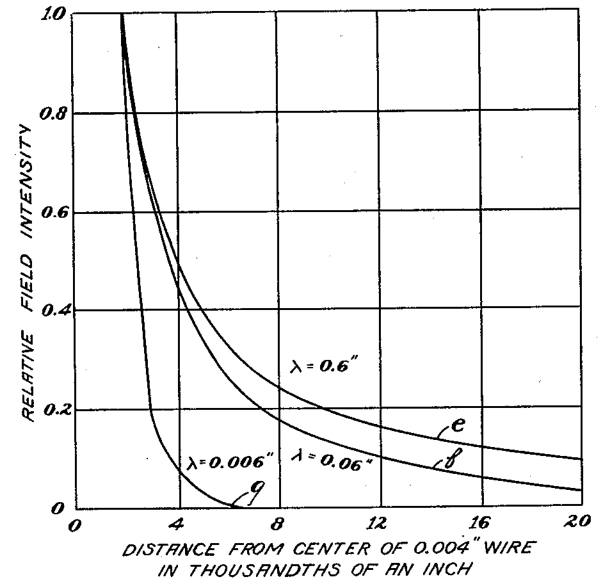
Fig. 6 is a chart showing several curves indicating the variation of the perpendicular component of the magnetic field around the recording medium.

The curves *e*, *f* and *g* of Fig. 6 show that the perpendicular component of the magnetic field about the recording medium decreases very rapidly as the distance from the center of the recording medium increases. They also show that the rate of decrease is very much greater when $\gamma$ is small (corresponding to high frequencies) than when $\gamma$ is large (low frequencies). This latter fact makes it possible to design a reproducing head which will reproduce low frequencies well but which will have negligible response at medium and high frequencies.

Figure 7:
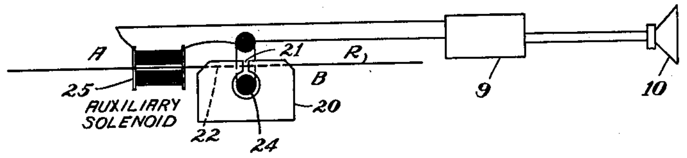
Fig. 7 is a schematic showing of one form of the reproducing head of the present invention.

In accordance with one embodiment of the invention, schematically illustrated in Fig. 7, the reproducing head or unit comprises the portions A and B. Portion B includes a ferromagnetic core 20 of flat material having in one edge thereof a transverse gap 21. The mentioned edge of the core has a slot 22 therein to guide a ferromagnetic recording medium such as a wire or tape R along said core and across the gap. A primary pick-up coil 24 cooperates with core 20 and the recording medium to develop a voltage response. In the arrangement illustrated in Fig. 7, the coil 24 encircles a portion of the core at the gap 21 and also encircles the recording medium R. However, portion B of the reproducing unit may be similar in construction to the reproducing unit disclosed in the copending application of Latchford and Holmes, Serial No. 582,642, filed March 14, 1945, now Patent No. 2,413,108, granted December 24, 1946. The portion B of the unit provides a voltage response of the character illustrated by curve *b* of Fig. 2.

Figure 8:
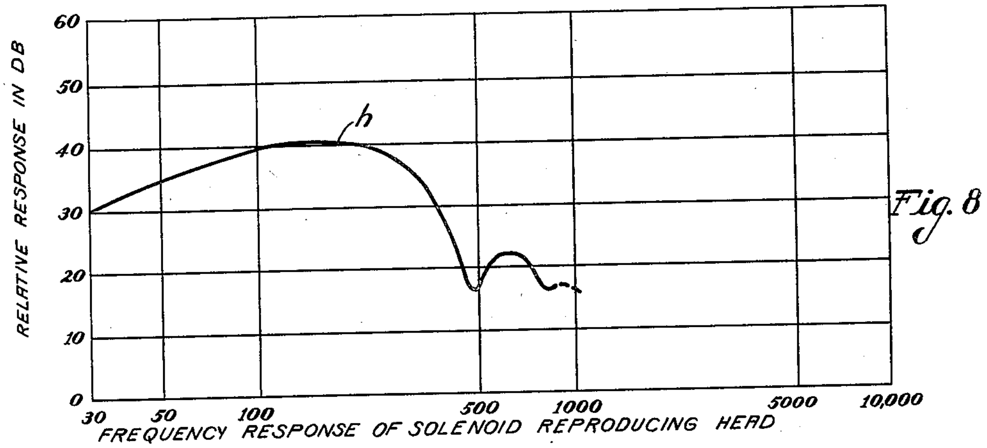
Fig. 8 is a chart illustrating the frequency response of the low frequency responding portion of the reproducing head of Fig. 7.
Figure 9:
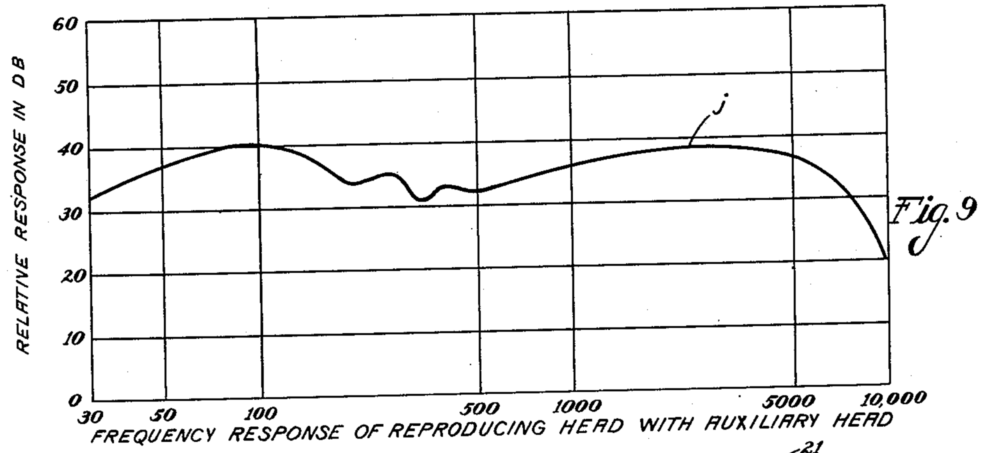
Fig. 9 is a chart indicating the overall frequency response of the reproducing head of Fig. 7.

The portion A of the unit, in this embodiment comprises a coil 25 connected in series with the coil 24 and likewise having the recording medium pass therethrough. Ideally the coils 24 and 25 should occupy the same space to encircle the same portion of the recording medium. Since this is impossible, these coils are placed as close together as possible to approach this desirable relation. The internal and external diameter as well as the length of the coil 25 can be adjusted to give the desired low frequency voltage response but to give negligible voltage response at medium and high frequencies of the character indicated by experimental curve *h* of Fig. 8. In Fig. 9 there is illustrated a voltage response curve *j*, derived experimentally by using the reproducing unit of Fig. 7. This response is obviously more uniform throughout the audible range than that obtained from a conventional reproducing head alone or from a reproducing head with an additional long gap or with a medium gap and a long gap. It will be understood that the coil 25 in the arrangement of Fig. 7, can be lowered slightly so that the recording medium R will travel parallel to the coil axis but will not be threaded through the coil.

Figure 10:
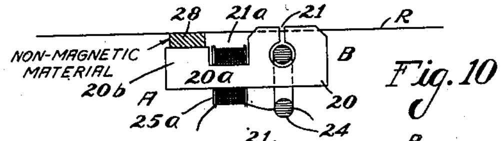
Figs. 10, 11, 12 and 13 are schematic showings of other modified forms of the invention.

In the modified form of the invention shown in Fig. 10, the reproducing head still comprises reproducing portions A and B. Portion B also includes the ferromagnetic core 20 with a narrow or short gap therein. The primary pick-up coil 24 encircles one of the parts of the core. The core is provided with an extension 20*a* which is provided with a relatively long gap 21*a*. A coil 25*a* is positioned in the gap 21*a* and is connected in series with the coil 24. Inasmuch as coil 25 of Fig. 7 has been replaced by the gap 21*a*, the above mentioned requirement of close proximity of coils, which, of course, means close proximity of pickup areas, becomes a requirement for close proximity of gaps, i. e., the spacing between gaps 21 and 21*a* (see Fig. 10) should be as small as possible with due regard for the design of the two magnetic circuits. The core 20 may be considered to have three branches, two of them terminating closely together to establish the short gap 21 and the third branch 20*b* cooperating with one of the first two branches to form the relative long gap 21*a*. Thus, the spacing between gaps 21 and 21*a* is determined by the dimensions of the branch common to the two gaps. The extension 20*a* on the core is similar to a reproducing head with a long gap except that the recording medium R is separated from one pole 20*b* by a separator 28. In one form of the invention this separator is of non-magnetic material. As a result of the use of this separator, discrimination is effected between two bands of audio frequencies, as previously indicated in the discussion of the curves of Fig. 6. Thus, at low frequencies where the perpendicular component of the magnetic field is relatively strong at a given distance from the recording medium, the secondary or auxiliary portion A of the reproducing head will act quite similar to a reproducing head with a long gap. However, at high frequencies where the perpendicular component of the magnetic field is very weak at the given distance from the recording medium, the secondary or auxiliary portion of the reproducing head will be ineffective. Consequently, by connecting the two coils 24 and 25*a* in series good reproduction can be obtained at both low and high frequencies.

The relative magnitude of the voltage response at low and high frequencies can be adjusted by varying the number of turns on one of the coils such as 24 and 25*a* relative to that on the other. The frequency at which the low frequency portion B of the reproducing head ceases to be effective can be adjusted by varying the distance between the recording medium and the auxiliary pole, that is by changing the thickness of the separator, and by varying the length of the auxiliary gap 21*a*. The phase of the voltage in the coil 25*a* can be adjusted with respect to that in the coil 24 at the cross-over frequency (the frequency at which the voltages from the two coils are equal) by varying the distance between the centers of the gaps and by proper choice of the polarity of the coils. It is desirable to have the voltages from the two coils add in phase at the cross-over frequency; otherwise there will be an objectionable dip in the frequency response in the region of the cross-over frequency. It should be mentioned that some control over the shape of the frequency response curve in the low frequency region is available by varying the shape of the auxiliary pole piece 20*a*. Thus, a number of parameters can be varied to obtain the type of frequency response desired, such as either base equalization or base accentuation.

It has been mentioned that the separator 28, disclosed in Fig. 10, is of non-magnetic material. In another modified form of the invention a block of copper is substituted for this nonmagnetic material. By using a block of copper eddy currents developed therein will cause the effective reluctance to increase with frequency.

Figure 11:
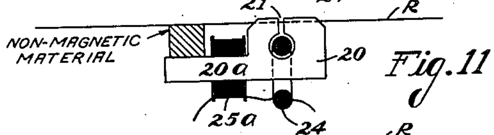

The modified form of the invention shown in Fig. 11 is similar to that shown in Fig. 10 except that the core 20 is provided with a straight extension 20*a* on the main magnetic circuit, gap 21*a* being omitted.

Figure 12:
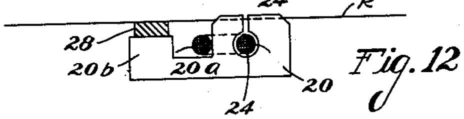

The modified form of the invention shown in Fig. 12 is similar to that illustrated in Fig. 10 except that a single pickup coil 24 encircles the middle leg of the core thereby obviating the need of two separate coils.

Figure 13:
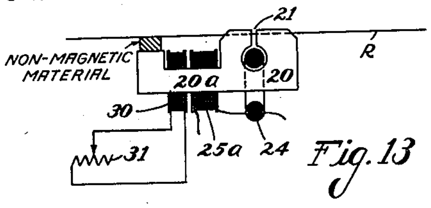

In the further modified form of the invention, shown in Fig. 13, the unit of Fig. 10 is provided with an extra coil 30 encircling the extension 20*a* on the core, in the position shown. This coil is short-circuited by an adjustable resistance element 31 of suitable value, to provide an effect similar to that obtained by using the block of copper or the like. It will be understood that as the frequency increases, the short-circuited coil 30 acts to produce a magneto-motive force which tends to oppose any change of flux through it. The extra coil 30 is optional in this arrangement.

It should be mentioned that the portion B of the reproducing head or unit can be used as a recording head as in the case of conventional heads. When used in this manner the additional coil 25 is not connected in the recording circuit.

What we claim is:

1. In a device of the class described, a flat core having a gap therein, said core having a slot therein extending across said gap and serving to guide a ferromagnetic record medium across said gap, a coil encircling a portion of said core in the region of said gap, said core having an integral extension directed along the path of said medium but spaced therefrom, and a second coil encircling said extension, said second coil being located in close physical relation to said first coil whereby both of said coils are responsive substantially to the same region of said medium.

2. In a device of the class described, a flat core having a gap therein, said core having a slot therein extending across said gap and serving to guide a ferromagnetic record medium across said gap, a coil encircling a portion of said core in the region of said gap, said core having an integral extension directed along the path of said medium but spaced therefrom, a second coil encircling said extension, said second coil being located in close physical relation to said first coil whereby both of said coils are responsive substantially to the same region of said medium, a third coil encircling said extension, and an adjustable resistor short-circuiting said third coil.

3. In a device of the class described, a flat core having a gap therein, said core having a slot therein extending across said gap and serving to guilde the ferromagnetic medium across said gap, a coil encircling the portion of said core in the region of said gap, said core having an integral extension directed along the path of said medium, a block of insulating material spacing said extension from said medium, and a second coil encircling said extension, said second coil being located in close physical relation to said first coil whereby both of said coils are responsive substantially to the same region of said medium.

4. In a device of the class described, a flat core having a gap therein, said core having a slot therein extending across said gap and serving to guide the ferromagnetic medium across said gap, a coil encircling the portion of said core in the region of said gap, said core having an integral extension directed along the path of said medium, a block of electrically conducting material such as copper spacing said extension from said medium, and a second coil encircling said extension, said second coil being located in close physical relation to said first coil whereby both of said coils are responsive substantially to the same region of said medium.

5. In a device of the class described, a flat core having a gap therein, said core having a slot therein extending across said gap and serving to guide the ferromagnetic medium across said gap, a coil encircling the portion of said core in the region of said gap, said core having an integral extension directed along the bath of said medium, said extension being provided with a projection directed toward said medium but terminating short thereof, said projection and said core defining a notch, and a second coil encircling said extension, said second coil being located in said notch in close physical relation to said first coil whereby both of said coils are responsive substantially to the same region of said medium.

6. In a device of the class described, a flat core having a gap therein, said core having a slot therein extending across said gap and serving to guide the ferromagnetic medium across said gap, said core being provided with a recess communicating with said gap, said core having an integral extension directed along the path of said medium, said extension being provided with a projection directed toward said medium but terminating short thereof, said projection and said core defining a notch, and a coil encircling the portion of the core between said notch and said recess.

7. Apparatus for discriminating between two bands of audio frequencies recorded on a ferromagnetic medium comprising means for developin a voltage response in one of said bands to the substantial exclusion of the other band, means for controlling said voltage response in accordance with the variation of the perpendicular component of field intensity, as a function of wavelength at a given distance from the center of said medium, in accordance with the equation:

$$H_z=\frac{4M\pi}{\lambda}\left(\sin\frac{2\pi X}{\lambda}\right)K_1\left[\frac{2\pi Z}{\lambda}\right]$$

in which:

$H_z$ is the component of the magnetic intensity perpendicular to the length of the recording medium, M is the maximum value of the magnetic intensity on the axis of the recording medium, $\lambda$ is the wavelength, X is the distance from the origin to the point at which it is desired to find $H_z$, measured along a line parallel to the axis of the recording medium, Z is the perpendicular distance from the axis of the recording medium to the point at which it is desired to find $H_z$, and $K_1$ is a modified Bessel function of the second kind of order one.

8. Apparatus for reproducing a record from a ferromagnetic medium comprising means for developing from a portion of said medium a voltage response predominantly in the upper portion of the audio frequency range, and means for developing simultaneously from a portion of the medium near to the first portion another voltage response supplementing the first mentioned response and predominantly in the lower portion of the audio frequency range, the first means including a magnetic circuit having a short gap in a direction parallel to said medium, said medium passing in close proximity to the poles comprising said short gap, the second means including a magnetic circuit adjacent said first mentioned magnetic circuit and having a long gap, in a direction parallel to said medium, at least one pole defining said long gap being spaced a predetermined distance away from the surface of said medium, and means for translating the responses in said magnetic circuits into sound.

9. Apparatus as defined in claim 8 in which the distance between said gaps is made as small as possible.

10. Apparatus for reproducing a record from a ferromagnetic medium comprising a magnetic core having three branches, two of said branches terminating closely adjacent each other to establish a short gap, means associated with said two branches for developing a voltage response, said response being predominantly in the upper portion of the audio frequency range, the third of said branches being so disposed with respect to one of the other branches to establish a relatively long gap therebetween, means associated with said third and said other branch for developing a second voltage response, said second response being predominantly in the lower portion of the audio frequency range, means for conducting the medium across said short gap in close proximity to both branches and for conducting said medium across said long gap in spaced relationship with respect to said third branch, and means for translating the response in said voltage developing means into sound.

11. In a device for reproducing a record from a ferromagnetic medium, a first magnetic circuit including a short gap, a second magnetic circuit including a long gap and being disposed closely adjacent said first circuit, means for guiding said ferromagnetic medium across said gaps in succession at different distances therefrom, said gaps and said guiding means being so arranged that said gaps are parallel to the line of motion of said medium, means for developing voltage responses from those portions of said medium passing through said gaps, and means for translating said responses into sound.

12. In a device for reproducing a record from a ferromagnetic medium, a first magnetic circuit including a short gap, a second magnetic circuit including a long gap and being disposed closely adjacent said first circuit, means for guiding said ferromagnetic medium across said gaps in succession whereby voltage responses are developed from adjacent portions of the medium, the phase of the voltage at the cross over frequency in one coil with respect to that in the other coil being affected by the distance between the centers of said gaps, the distance being chosen such that the voltage responses tend to add at the cross over frequency of responses, and means for translating said responses into sound.

13. In a device for reproducing a record from a ferromagnetic medium, a first magnetic circuit including a short gap, a second magnetic circuit including a long gap and being disposed closely adjacent said first circuit, means for guiding said ferromagnetic medium across said gaps in succession whereby voltage responses are developed from adjacent portions of the medium, the phase of the voltage at the cross over frequency in one coil with respect to that in the other coil being affected by the polarity of the coils, the polarity being such that the voltage responses tend to add at the cross over frequency of the responses, and means for translating said responses into sound.

14. A magnetic reproducing head comprising a core of relatively high magnetic permeability and relatively low magnetic retentivity, said core having a base and at least three legs projecting therefrom, two of said legs having end portions positioned in closely spaced relationship with respect to each other to define a non-magnetic gap over which a magnetic record member having a magnetic record thereon is arranged to pass, a signal coil on one of said two legs, said third leg insofar as its magnetic portion is concerned terminating at a substantial distance from the path of travel of said record member, and a second signal coil mounted on said third leg.

15. A magnetic reproducing head comprising a core of relatively high magnetic permeability and relatively low magnetic retentivity; said core having a base and at least three legs projecting therefrom; two of said legs having end portions positioned in closely spaced relationship with respect to each other to define a first non-magnetic gap over which a magnetic record member having a magnetic record thereon is arranged to pass; the third of said legs having an end portion positioned in relatively widely spaced relationship with respect to one of said two legs to define a second non-magnetic gap over which said record member is arranged to pass and terminating at a substantial distance from the path of travel of said record member; a first magnetic circuit comprising said two legs and a portion of said base; a second magnetic circuit comprising one of said two legs, said third leg, and a portion of said base; and signal coil means disposed in inductive relationship to said magnetic circuits.

16. A magnetic reproducing head comprising a core of relatively high magnetic permeability and relatively low magnetic retentivity; said core having a base and at least three legs projecting therefrom; two of said legs having end portions positioned in closely spaced relationship with respect to each other to define a first non-magnetic gap over which a magnetic record member having a magnetic record thereon is arranged to pass; the third of said legs having an end portion positioned in relatively widely spaced relationship with respect to one of said two legs to define a second non-magnetic gap over which said record member is arranged to pass and terminating at a substantial distance from the path of travel of said record member; a first magnetic circuit comprising said two legs and a portion of said base; a first signal coil mounted on said first circuit; a second magnetic circuit comprising one of said two legs, said third leg, and a portion of said base; and a second signal coil mounted on said circuit.

LYNN C. HOLMES.
DONALD L. CLARK.

REFERENCES CITED

The following references are of record in the file of this patent:

UNITED STATES PATENTS

| Number | Name | Date |
|---|---|---|
| 2,251,300 | Star | Aug. 5, 1941 |
| 2,285,079 | Behre | June 2, 1942 |
| 2,300,320 | Swartzel | Oct. 27, 1942 |
| 2,351,010 | Camras | June 13, 1944 |
| 2,416,279 | Begun | Feb. 25, 1947 |
| 2,432,162 | Jones | Dec. 9, 1947 |
| 2,435,871 | Camras | Feb. 10, 1948 |

FOREIGN PATENTS

| Number | Country | Date |
|---|---|---|
| 594,991 | Germany | Mar. 24, 1934 |

OTHER REFERENCES

Barrett and Tweed: Some Aspects of Magnetic Recording, 4 sheets.

Selby: Investigation of Magnetic Tape Recorders, Electronics, May 1944, 3 sheets, pages 133–135 and 302.